United States Patent
Klevans et al.

(10) Patent No.: US 7,047,176 B2
(45) Date of Patent: May 16, 2006

(54) METHOD AND SYSTEM FOR HARDWARE SIMULATION

(75) Inventors: Richard L. Klevans, Morrisville, NC (US); Rajaraman Krishnan, Chennai (IN); Suresh Ramakrishnan, Morrisville, NC (US)

(73) Assignee: Fujitsu Limited, Kawasaki (JP)

( * ) Notice: Subject to any disclaimer, the term of this patent is extended or adjusted under 35 U.S.C. 154(b) by 932 days.

(21) Appl. No.: 09/849,010

(22) Filed: May 4, 2001

(65) Prior Publication Data

US 2001/0049594 A1    Dec. 6, 2001

Related U.S. Application Data

(60) Provisional application No. 60/202,190, filed on May 5, 2000.

(51) Int. Cl.
    G06F 9/44 (2006.01)
(52) U.S. Cl. .............. 703/21; 703/20; 703/22; 703/17; 714/28; 714/38; 709/223; 709/224; 709/226
(58) Field of Classification Search ............ 703/16, 703/17, 21, 27; 714/28
    See application file for complete search history.

(56) References Cited

U.S. PATENT DOCUMENTS

| | | | |
|---|---|---|---|
| 5,229,990 A | 7/1993 | Teraslinna | 370/60 |
| 5,231,633 A | 7/1993 | Hluchyj et al. | 370/94.1 |
| 5,440,719 A * | 8/1995 | Hanes et al. | 703/21 |
| 5,461,624 A | 10/1995 | Mazzola | 370/85.13 |
| 5,590,133 A | 12/1996 | Billström et al. | 370/349 |
| 5,771,370 A | 6/1998 | Klein | 395/500 |
| 5,781,534 A | 7/1998 | Perlman et al. | 370/248 |
| 5,809,282 A * | 9/1998 | Cooper et al. | 709/226 |
| 5,812,530 A * | 9/1998 | Fernandez et al. | 370/250 |
| 5,818,842 A | 10/1998 | Burwell et al. | 370/397 |
| 5,825,772 A | 10/1998 | Dobbins et al. | 370/396 |
| 5,850,399 A | 12/1998 | Ganmukhi et al. | 370/412 |
| 5,852,606 A | 12/1998 | Prince et al. | 370/393 |
| 5,881,267 A * | 3/1999 | Dearth et al. | 703/27 |
| 5,889,954 A * | 3/1999 | Gessel et al. | 709/223 |
| 5,892,763 A * | 4/1999 | Laraqui et al. | 370/395.53 |
| 5,907,695 A * | 5/1999 | Dearth | 703/17 |
| 5,907,696 A | 5/1999 | Stilwell et al. | 395/500 |
| 5,946,308 A | 8/1999 | Dobbins et al. | 370/392 |
| 5,956,341 A | 9/1999 | Galand et al. | 370/412 |
| 6,018,766 A | 1/2000 | Samuel et al. | 709/218 |
| 6,028,842 A | 2/2000 | Chapman et al. | 370/235 |
| 6,058,113 A | 5/2000 | Chang | 370/390 |
| 6,075,767 A | 6/2000 | Sakamoto et al. | 370/228 |

(Continued)

FOREIGN PATENT DOCUMENTS

EP    0 512 495 A2    11/1992

(Continued)

OTHER PUBLICATIONS

"Network Simulations with OPNET", X. Chang, Proceedings of 1999 Winter Simulation Conference, IEEE 1999.*

(Continued)

*Primary Examiner*—Fred Ferris
(74) *Attorney, Agent, or Firm*—Baker Botts L.L.P.

(57) ABSTRACT

A system and method for simulating a networked system for testing of embedded software on an emulated hardware device. The system provides for automated generation of a simulated hardware and facilitates testing of embedded software response to simulated error conditions created by the simulated hardware. Communications from the embedded software are intercepted at a low software level and redirected from the emulated hardware device to the simulated hardware.

10 Claims, 4 Drawing Sheets

U.S. PATENT DOCUMENTS

| | | | |
|---|---|---|---|
| 6,205,158 B1 | 3/2001 | Martin et al. | 370/541 |
| 6,209,033 B1* | 3/2001 | Datta et al. | 709/224 |
| 6,314,531 B1* | 11/2001 | Kram | 714/38 |
| 6,317,426 B1 | 11/2001 | Afanador et al. | 370/352 |
| 6,324,495 B1* | 11/2001 | Steinman | 703/17 |
| 6,331,905 B1 | 12/2001 | Ellinas et al. | 359/110 |
| 6,353,593 B1 | 3/2002 | Chen et al. | 370/216 |
| 6,353,616 B1 | 3/2002 | Elwalid et al. | 370/443 |
| 6,359,857 B1 | 3/2002 | Ahmad et al. | 370/217 |
| 6,366,556 B1 | 4/2002 | Ballintine et al. | 370/216 |
| 6,366,875 B1* | 4/2002 | Colizzi et al. | 703/16 |
| 6,515,966 B1 | 2/2003 | Bardalai et al. | 370/236 |
| 6,523,169 B1* | 2/2003 | Glunz | 717/124 |
| 6,571,356 B1* | 5/2003 | Mehr et al. | 714/28 |
| 2001/0025310 A1 | 9/2001 | Krishnamurthy et al. | 709/223 |
| 2003/0191616 A1* | 10/2003 | Nightingale | 703/13 |

FOREIGN PATENT DOCUMENTS

| | | |
|---|---|---|
| EP | 0 849 970 A2 | 6/1998 |
| EP | 0 959 641 A1 | 11/1999 |
| WO | WO 97/40610 | 10/1997 |
| WO | WO 98/00954 | 1/1998 |
| WO | WO 99/11090 | 3/1999 |
| WO | WO 99/66675 | 12/1999 |
| WO | WO 00/10357 | 2/2000 |
| WO | WO 00/21254 | 4/2000 |
| WO | WO 00/24164 | 4/2000 |

OTHER PUBLICATIONS

"Fine-Grain simulation of the ANS Network". A.D. George et al, IEEE 0094-2898/95, IEEE 1995.*

"Modeling and Simulating Congestion Control in Wide-Area TCP Networks using BONeS", M. Gream,Thesis Presentation, 199.*

OPNET Modeler product brochure, Mil 3 Inc., 1999.*

Kermani, et al., "Virtual Cut-through: A New Computer Communication Switching Technique", Computer Networks, vol. 3, Cover, Table of Contents and pp. 267-285, 1979.

Cidon, et al., "MetaRing—A Full Duplex Ring with Fairness and Spatial Reuse", IEEE Transactions on Communications, vol. 41, Cover and pp. 110-120, Jan. 1993.

Ofek, et al., "METANET: Principles of an Arbitrary Topology LAN", IEEE Transactions on Networking, vol. 3, No. 2, Cover and pp. 169-180, Apr. 1995.

West, "Introduction to Graph Theory", Prentice Hall, ISBN 0-13-227828-6, QA166.W43 1996, 7 pages Cover, ISBN page, Table of Contents, and pp. 51-85.

Hunter, et al., "WASPNET: A Wavelength Switched Packet Network", IEEE Communications Magazine, 2-page cover and pp. 120-129, Mar. 1999.

Hernandez-Valencia, "A Simple Data Link (SDL) Framing Protocol for High-Speed Optical Packet Networks", OIF99.043.01, pp. 1-21, May 4, 1999.

Simpson, "The Point-to-Point Protocol (PPP)", RFC-1661, 50 pages, Jul. 1994.

Katz, et al., "Traffic Engineering Extensions to OSPF"IETF Draft, draft-katz-yeung-ospf-traffic-01.txt, pp. 1-8, Oct. 1999.

Crawley, et al., "A Framework for Qos Based Routing in the Internet", RFC 2386, 35 pages, Aug. 1998.

Wimer, et al., FORE Systems, Inc., "OSPF Sub-Areas", IETF Draft, draft-winner-ospf-sub-areas-00.txt, 13 pages, Oct. 1999.

Wimer, et al., FORE Systems, Inc., "Additional OSPF Extensions for Traffic Engineering and Qos Routing", IETF Draft, draft-wimer-ospf-traffic-00.txt, 5 pages, Feb. 1999.

Yeung, "OSPF Extensions for Traffic Engineering", IETF Draft, draft-yeung-ospf-traffic-00.txt, 9 pages, Feb. 1999.

Apostolopoulos, et al., "Qos Routing Mechanism and OSPF Extensions", RFC 2676, 47 pages, Aug. 1998.

Smit, et al., "IS-IS Extensions for Traffic Engineering", IETF Draft, draft-ietf-isis-traffic-00.txt, 10 pages, May 1999.

Awduche, et al., UUNET (MCI WorldCom), "Requirements for Traffic Engineering Over MPLS", RFC 2702, 28 pages, Sep. 1999.

Blake, et al., "An Architecture for Differentiated Services", RFC 2475, 34 pages, Dec. 1998.

Braden, et al., "Resource ReSerVation Protocol (RSVP)", Version I Functional Specification, RFC 2205, 105 pages, Sep. 1997.

Wroclawski, "Specification of the Controlled-Load Network Element Service,", RFC 2211, 18 pages, Sep. 1997.

Shenker, et al., "Specification of Gurauranteed Quality of Service". RFC 2212, 19 pages, Sep. 1997.

Reynolds, et al., ISI, "Assigned Numbers", RFC 1700, 215 pages, Oct. 1994.

Jacobson, et al.,"An Expedited Forwarding PHB", RFC 2598, 11 pages, Jun. 1999.

Heinanen, et al., "Assured Forwarding PHB Group", RFC 2597, 11 pages, Jun. 1999.

Manchester, et al., Bell Laboratories, "IP over SONET", IEEE Communications Magazine, vol. 36, No. 5, cover and pp. 136-142, May 1998.

Heinanen, Telecom Finland "Multi-Protocol Encapsulation over ATM Adaptation Layer 5", RFC 1483, 15 pages, Jul. 1993.

The ATM Forum, Technical Committee, "Private Network-Network Interface Specification Version 1.0", af-pnni-0055.000, cover, introduction, acknowledgements and table of contents (18 pages) and 366 pages of text, Mar. 1996.

Callon, Digital Equipment Corporation, "Use of OSI IS-IS for Routing in TCP/IP and Dual Environments", RFC 1105, 80 pages, Dec. 1990.

Moy, Ascend Communications "OSPF Version 2", RFC 2328, 204 pages, Apr. 1998.

Malkin, Bay Networks, "RIP Version 2 ", RFC 2453, 37 pages, Nov. 1998.

Rekhter, et al., "A Border Gateway Protocol 4 (BGP-4)", RFC 1771, 54 pages, Mar. 1995.

Goguen, et al., "RSVP Label Allocation for Backup Tunnels", draft-swallow-rsvp-bypass-label-00.txt, IETF Document, 10 pages, Oct. 1999.

Callon, et al., "A Framework for MPLS", draft-ietf-mpls-framework-05.txt, IETF document, 69 pages, Sep. 1999.

Rosen, et al., "Multiprotocol Label Switching Architecture", draft-ietf-mpls-arch-06.txt, IETF Document, 62 pages, Feb. 1999.

Rosen, et al., "MPLS Label Stack Encoding", IETF document, draft-ietf-mpls-label-encaps-07.txt, 22 pages, Sep. 1999.

Andersson, et al., "LDP Specification", IETF document, draft-ietf-mpls-ldp-06.txt, 124 pages, Oct. 1999.

Jamoussi, Nortel Networks Corp., "Constraint-Based LSP Setup Using LDP", draft-ietf-mpls-cr-ldp-03.txt, IETF Document, pp. 1-39, Sep. 1999.

Guerin, "Qos Routing in Networks with Inaccurate Information: Theory and Algorithms", IEEE/ACM Transactions on Networking, vol. 7, No. 3, cover and pp. 350-364, Jun. 1999.
Parekh, et al., "*A Generalized Processor Sharing Approach to Flow Control in Integrated Services Networks: The Single Node Case*", IEEE Transactions on Networking, vol. 1, No. 3, cover and pp. 344-357, Jun. 1993.
Parekh, et al., "*A Generalized Processor Sharing Approach to Flow Control in Integrated Services Networks: The Multiple Node Case*", IEEE Transactions on Networking, vol. 2, No. 2, cover and pp. 137-150, Apr. 1994.
Golestani, "*A Self-Clocked Fair Queuing Scheme for Broadband Applications*", Proceedings of IEEE Infocom '94, Toronto, Ontario, Canada, cover and pp. 636-646, Jun. 1994.
Zhang, "*Virtual Clock: A New Traffic Control Algorithm for Packet Switching Networks*", ACM SIGCOMM Computer Communication Reviews, vol. 20, No. 4, pp. 19-29, Sep. 1990.
Ferrari, et al., "*Scheme for Real-Time Channel Establishment in Wide-Area Networks*", IEEE Journal on Selected Areas in Communications, vol. 8, No. 3, cover and pp. 368-379, Apr. 1990.
Wrege, et al., "*A Near-Optimal Packer Scheduler for QoS Networks*", Proceedings of IEEE Infocom '97, Kobe, Japan, cover and pp. 576-583, Apr. 7-12, 1997.
Golestani, "*A Stop-and-Go Queuing Framework for Congestion Management*", ACM SIGCOMM Computer Communications Review, vol. 20, No. 4., pp. 8-18, Sep. 1990.
Kalmanek, et al., "*Rate Controlled Servers for Very High-Speed Networks*", Proceedings of IEEE Globecom '90, San Diego, CA, Conference Record vol. 1 of 3, cover and pp. 300.3.1-300.3.9, Dec. 2-5, 1990.
Sriram, K., "*Methodologies for Bandwidth Allocation, Transmission, Scheduling and Congestion Avoidance in Broadband ATM Networks*", Proceedings of IEEE Globecom, '92, Orlando, FL, Conference Record vol. 3 of 3, cover and pp. 1545-1551, Dec. 6-9, 1992.
Jacobson, et al., "*Random Early Detection Gateways for Congestion Avoidance*", ACM/IEEE Transactions on Networking, vol. 1, No. 4, cover and pp. 397-413, Aug. 1993.
Braden, et al., "*Recommendations on Queue Management and Congestion Avoidance in the Internet*", RFC 2309, 16 pages, Apr. 1998.
Jacobsen, "*Notes on Using RED for Queue Management and Congestion Avoidance*", Network Research Group, Berkeley National Laboratory, Berkeley, CA, NANOG 13, Dearborn, MI, cover and 15 pages, Jun. 8, 1998.
May, et al., "*Analytic Evaluation of RED Performance*", pp. 1-10, Jun. 1998.
May, et al., "*Reasons Not To Deploy RED*", pp. 1-5, May 1999.
Lakshman, et al., "*SRED: Stabilized RED*", pp. 1-10, Mar. 1999.
Feng, et al., "*BLUE: A New Class of Active Queue Management Algorithms*", pp. 1-27, Mar. 1999.
Cisco's "*Distributed Weighted Random Early Detection*", Source=http://www.cisco.com/univered cc/td/doc/product/software/ios111/cc111/wred.htm#xtocid236360, 17 pages, Feb. 9, 1998.
J. Wroclawski, MIT LCS "*The Use of RSVP with IETF Integrated Services*", RFC 2210, 31 pages, Sep. 1997.
Shenker, et al., "*General Characterization Parameters for Integrated Service Network Elements*", RFC 2215, 15 pages, Sep. 1997.
Braden, et al., "*RAPI—An RSVP Application Programming Interface, Version 5*", Internet Draft, 25 pages, Aug. 11, 1998.
Katsube, et al., "*Toshiba's Router Architecture Extensions for ATM: Overview*", RFC 2098, 17 pages, Feb. 1997.
Rekhter, et al., "*Cisco Systems' Tag Switching Architecture Overview*", RFC 2105, 13 pages, Feb. 1997.
Viswanathan, et al., "*ARIS: Aggregate Route-Based IP Switching*", Internet draft, 19 pages, Mar. 1997.
Newman, et al., "*Ipsilon Flow Management Protocol Specification for IPv4 Version 1.0*", RFC 1953, 19 pages, May 1996.
Davie, et al. "*Switching in IP Networks*", ISBN 1-558650-505-3, TK5105.875.I57,D38, Morgan Kaufmann Publishers, Inc., San Francisco, CA, 8 pgs. cover, ISBN page, table of contents, pp. 27-55, 117-154, 219-232, 1998.
Moy, Proteon, Inc., "*OSPF Version 2,* ", 202 pages, Mar. 1994.
Fuller, et al., "*Classless Inter-Domain Routing (CIDR): An Address Assignment and Aggregation Strategy*", RFC 1519, 23 pages, Sep. 1993.
Dumortier, "*Toward a New IP over ATM Routing Paradgm*", IEEE Communications Magazine, 2-page cover and pp. 82-86, Jan. 1998.
White, et al., "*ATM Switching and IP Routing Integration: The Next Stage in Internet Evolution?*", IEEE Communications Magazine, 2-page cover and pp. 79-83, Apr. 1998.
Viswanathan, et al., "*Evolution of Multiprotocol Label Switching*", IEEE Communications Magazine, 2-page cover and pp. 165-173, May 1998.
Laubach, "*Classical IP and ARP over ATM*", RFC 1577, 16 pages, Jan. 1993.
Callon, et al., "*A Framework for Multiprotocol Label Switching*", Internet-Draft, 65 pages, Nov. 1997.
Schmidt, et al., "*Multiprotocol over ATM—Building State of the Art ATM Intranets*", Manning Publications Co., ISBN 1-884777-42-2, TK5 105.875.16S36, 8 pgs. cover, ISBN page, table of contents, and pp. 207-289, 1998.
Halabi, "*Internet Routing Architecture*", Cisco Systems, New Riders, Cisco Press, 6 pgs. cover, ISBN page table of contents, and pp. 87-190, 1997.
Finn, et al., "*LAN Emulation over ATM Version 2.0-LUNI Specification*", The ATM Forum Technical Committee, AF-LANE-0084.000, 153 pages, Jul. 1997.
Alexander, et al., "*Multi-Protocol over ATM Version 1.0*", AF-MPOA-0087.000, The ATM Forum Technical Committee, 154 pages, Jul. 1997.
Deering, Stanford University, "*Host Extensions for IP Multicasting*", STD 5, RFC 1112, 16 pages, Aug. 1989.
Sahinoglu, et al., "*On Multimedia Networks: Self-Similar Traffic and Network Performance*", IEEE Communications Magazine, vol. 37, No. 1, cover and pp. 48-52, Jan. 1999.
Fishburn, et al., "*Dynamic Behavior of Differential Pricing and Quality of Service Options for the Internet*", Proc. First Inter. Conf. on Information and Computation Economics (ICE-98), ACM Press, 1998, pp. 128-139, 1998.
Steinmetz, et al., "*Multimedia: Comuting Communications and Applications*", Prentice Hall, ISBN 0-13-324435-0, QA76.575.S73, cover, acknowledgement page, LOC page, Index (15 pgs) and pp. 420-450, 1995.
Gale, et al., "*College Admissions and the Stability of Marriage*", The American Mathematical Monthly, vol. 69, No. 1, cover and pp. 9-15, 1962.
McKeown, "*Scheduling Algorithms for Input-Queued Cell Switches*"Ph.D. Thesis, Univ. of California at Berkeley, UMI No. 9602658, 12 pages cover, information, acknowledgement and index pages, 119 pages text, 1995.

Simpson, Daydreamer, "PPP over SONET/SDH", RFC 1619, 6 pages, May 1994.

Simpson, Daydreamer, "Point-to-Point Protocol (PPP)", RFC 1161, 50 pages, Jul. 1994.

Simpson, Daydreamer, "PPP in HDLC-Like Framing", RFC 1662, 24 pages, Jul. 1994.

McCloghrie, et al., "Management Information Base for Network Management of TCP/IP-Based Internets: MIB-II"RFC 1213, 66 pages, Mar. 26, 1991.

Baker, et al., Cisco Systems, "OSPF Version 2 Management Information Base", RFC 1850, 75 pages, Nov. 1995.

Baker, et al., Cisco Systems, "RSVP Management Information Base Using SMIv2", RFC 2206, 60 pages, Sep. 1997.

Kastenholz, FTP Software, Inc., "The Definitions of Managed Objects for the Link Control Protocol of the Point-to-Point Protocol", RFC 1471, 24 pages, Jun. 1993.

Kastenholz, FTP Software, Inc., "The Definitions of Managed Objects for the IP Network Control Protocol of the Point-to-Point Protocol", RFC 1473, 10 pages, Jun. 1993.

Baker, Cisco Systems, "IP Forwarding Table MIB", RFC 2096, 20 pages, Jun. 1997.

Awduche, et al., draft-ietf-tewg-framework-01.txt (IETF), "A Framework for Internet Traffic Engineering"63pages, Jul. 2000.

U.S. Appl. No. 09/588,634, entitled "Method and System for Providing a Protection Path for Connection-Oriented Signals in a Telecommunications Network", inventors Mo, et al., 32 pages specification, claims and abstract and 3 pages of drawings, Jun. 6, 2000.

U.S. Appl. No. 09/589,038, entitled "Method and System for Providing a Protection Path for Connectionless Signals in a Telecommunications Network", inventors Mo, et al., 38 pages specification, claims and abstract and 9 pages of drawings, Jun. 6, 2000.

U.S. Appl. No. 09/588,806, entitled "Transport Network and Method", inventors Mo, et al., 40 pages specification, claims and abstract and 9 pages of drawings, Jun. 6, 2000.

U.S. Appl. No. 09/588,636, entitled "Method and System for Transporting Traffic in a Packet-Switched Network", inventors Mo, et al., 32 pages specification, claims and abstract and 6 pages of drawings, Jun. 6, 2000.

U.S. Appl. No. 09/588,632, entitled "System and Method Connectionless/Connection Oriented Signal Transport", inventors Mo, et al., 44 pages specification, claims and abstract and 7 pages of drawings, Jun. 6, 2000.

U.S. Appl. No. 09/848,994, entitled "Method and System for Quality of Services (QoS) Support in a Packet-Switched Network", inventors Li Mo, et al., 35 pages specification, claims and abstract and 6 pages of drawings, May 4, 2001.

U.S. Appl. No. 09/848,871, entitled "Method and System for Modeling and Advertising Asymmetric Topology of a Node in a Transport Network", inventors Jaber, et al., 35 pages specification, claims and abstract and 10 pages of drawings, May 4, 2001.

U.S. Appl. No. 09/849,003, entitled "Unique Address Space and Method for a Transport Network", inventor Edwin Alton Harbin, 36 pages specification, claims and abstract and 10 pages of drawings, May 4, 2001.

Birman A et al.: "Support for RSVP-Based Services Over ATM Networks," Communications: The Key to Global Prosperity. Globecom 1996. Global Internet 96 Conference Record. London, Nov. 18-22, 1996, Global Telecommunications Conference (Globecom, New York, IEEE, US, vol. SUPP, 18, Nov. 1996 pp. 10-15, XP000741665 ISBN: 0-7803-3337-3.

Sharma et al.: "Scalable timers for soft state protocols," Infocom '97. Sixteenth Annual Joint Conference of the IEEE Computer and Communications Societies. Driving the Information Revolution., Proceedings IEEE Kobe, Japan Apr. 7-11, 1997, Los Alamitos, CA USA, IEEE Comptu. Soc, US Apr. 7, 1997, pp. 222-229, XP010252006, ISBN: 0-8186-7780-5.

International Search Report in International Application No. PCT/US01/14626, dated Feb. 5, 2002, 7 pages.

International Search Report in International Application No. PCT/US01/14622, dated Feb. 14, 2002, 7 pages.

Pancha P: "ATM Switch Routers for Combined Connection-Oriented and Connectionless Transport,"ISS '97. World Telecommunications Congress. (Int'l Switching Symposium). Global Network Evolution: Convergence or Collision?Toronto, Sep. 21-26, 1997, ISS. World Telecommunications Congress. (International Switching Symposium).

Mysore J. P. et al.: "Performance of transport protocols over a multicasting-based architecture fr Internet host mobility" Communications, 1998. ICC 98. Conference Record. 1998 IEEE International Conference on Atlanta, GA, USA Jun. 7-11, 1998, New York, NY USA, IEEE, US, Jun. 7, 1998, pp. 1817-1823, XP010284635, ISBN: 0-7803-4788-9.

Bar-Noy A. et al.: "Topology Distribution Cost vs. Efficient Routing in Large Networks," Computer Communications Review, Association for Computing Machinery, New York, US, vol. 20, No. 4, Sep. 1, 1990, pp. 242-252, XP000168058; ISSN: 0146-4833, whole document.

Intenational Search Report in International Application No. PCT/US01/13694, dated Mar. 12, 2002, 7 pgs.

Fritz J: "Bullet Proofing ATM: Part I," Byte, McGraw-Hill Inc. St. Peterborough, US, vol. 22, No. 6, Jun. 1, 1997, pp. 59-60, XP000691556, ISSN: 0360-5280, p. 60.

Sun H. et al.: "Supporting IP on the ATM networks: an overview," Computer Communications, Elsevier Science Publishers BV, Amsterdam, NL, vol. 21, No. 11, Aug. 10, 1998, pp. 1020-1029, XP004138773, ISSN: 0140-3664, whole document.

International Search Report in International Application No. PCT/US 01/13723, dated Oct. 31, 2001, 7 pages.

International Search Report in International Application No. PCT/US 01/13725, dated Oct. 31, 2001, 6 pages.

International Search Report in International Application No. PCT/US 01/14624, dated Nov. 6, 2001, 6 pages.

PCT Invitation to Pay Additional Fees in International Patent Application No. PCT/US 01/13732, dated Nov. 7, 2001, 4 pages.

Tsong-Ho Wu, "A Passive Protected Self-Healing Mesh Network Architecture and Applications," IEEE/ACM Transactions on Networking, Feb., 1994, 13 pages.

Written Opinion for PCT US01/14615, 5 pages, Aug. 14, 2003.

Form PCT/IPEA/416, Notification of Transmittal of International Preliminary Examination Report, with attached Form PCT/IPEA/409, PCT International Preliminary Examination Report (5 pages), for PCT/US01/13694 dated Mar. 19, 2003.

International Preliminary Examination Report in International Application No. PCT/US01/13695, dated Oct. 30, 2002, 4 pages.

International Preliminary Examination Report in International Application No. PCT/US01/13732, dated Jul. 12, 2002, 5 pages.

International Preliminary Examination Report in International Application No. PCT/US01/13725, dated Jun. 4, 2002, 5 pages.

Law A M et a: "Simulation Software for Communications Networks: The State of the Art," IEEE Communications Magazine, IEEE Service Center. Piscataway, N.J., US, vol. 32, No. 3, Mar. 1, 1994, p. 1, col. 2, line 4-p. 2, col. 1, line 39, p. 4, col. 1, line 3-p. 6, col. 1, paragraph 6; XP 000442186.

International Search Report in International Application No. PCT/US01/14615, dated Apr. 5, 2002, 7 pages.

PCT International Search Report in International Application No. PCT/US 01/13695, dated Oct. 9, 2001, 6 pages.

* cited by examiner

METHOD AND SYSTEM FOR HARDWARE SIMULATION

This Application claim the benefit of Provisional Application No. 60/202,190 filed May 5, 2000.

FIELD OF THE INVENTION

This invention relates to methods and systems for simulation of hardware systems and in particular to simulation of packet network transport systems.

BACKGROUND OF THE INVENTION

During the design and development of embedded systems, engineers often attempt to meld hardware and software systems to perform a variety of tasks. However, in order to test a particular designed software or device embodying the software, the engineer must often incorporate the device or software into an existing system having many elements of hardware and software. Furthermore, testing can often involve changes to specific portions of hardware and software of the system in order to test the software capacity to function in a system having these changes. To provide such a testing system and to provide changes to various portions of the system can be expensive and difficult.

SUMMARY OF THE INVENTION

Accordingly, a testing environment is provided which allows software developers to test their code prior to the availability of hardware. This can provide great benefit to developers since hardware is expensive and the simulator can provide testing of various hardware systems. In addition to providing simulated hardware, non-destructive reading of memory registers is facilitated and testing of difficult to reproduce fault conditions such as queue overflow is permitted. The simulator system also provides for automated testing of a suite of tests though a scripting interface.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION

The system for hardware simulation provides an environment in which embedded software developers can test their software code as implemented in a system without having to procure and install the actual hardware systems which form the environment in which the software is intended to operate.

Figure 1:
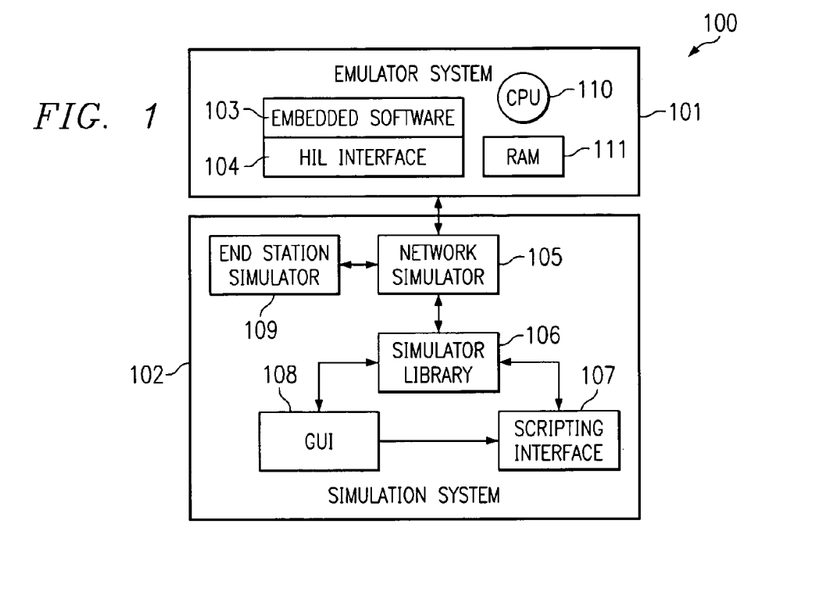
FIG. 1 is a block diagram of an overall architecture of an embodiment of a system for simulation of network transport in accordance with the invention.

FIG. 1 shows an overall system architecture of one embodiment of the system for hardware simulation 100 according to the invention that provides a testing platform for embedded software. The system can be distributed among several computers or it can be integration within a single computer. However, to provide a realistic testing environment, at least two separate computer systems are used. A first embodiment is shown in FIG. 1 in which an emulator system 101 and a simulation system 102 are provided as an example using two separate systems. At least one emulation system 101 is provided for emulating actions of the embedded software 103 which is to be tested.

The emulator system 101 includes a physical board having similar hardware to that which the embedded software 103 is intended to run on. The physical board is provided with a central processing unit (CPU) 110, on-board memory 111 and can have peripheral elements (not shown) such as Field Programmable Gate Arrays (FPGAs), communication ports which can include Ethernet and serial ports, among other things. One example of such an emulator system 101 can be a system board having a Receiver-Transmitter Pair (RTP) application specific integrated circuit (ASIC) mounted on the board. The RTP ASIC can have embedded software for controlling the processes of the RTP and which is to be tested. The embedded software 101 can be executed in a real-time operating system (RTOS), such as pSOS, and run on the central processing unit (CPU) of the physical board.

One instance of the embedded software 103 is executed on each CPU of an emulator system 101. If the physical board is provided with more than one CPU, then a version of the embedded software 103 can be executed on each CPU. In addition, the system for hardware simulation 100 can provide for multiple physical board and emulator systems 101. When multiple emulator systems 101 are provided, each associated CPU can be given a unique address to direct or attribute communication to the appropriate emulator system 101 where Internet Protocol (IP) or similar communication is provided for.

Each emulator system 101 is provided with a Hardware Interface Layer (HIL) interface 104 though which all interactions with the hardware are passed and permit interactions with the real hardware to be replaced with interactions with the simulated hardware. The HIL is the lowest level software above the real hardware. Thus, the HIL interface provides the embedded software 103 with a means to communicate events in the emulator system 101 to the network simulator 105. Such communication is provided across at least one interface according to the specific communication protocol to be implemented by the embedded software 103. Read and write requests to target registers of devices are intercepted at the hardware interface layer. Accordingly, read and write calls are made at an interface at the hardware interface layer 202. The HIL interface 104 is integrated with the embedded software 103 to run on the same board and utilize the same resources—such as CPU and associated memory—of each emulator system 101.

The simulation system 102 is provided to carry out the details of simulating a system of components which interact with each emulator system 101. The simulation system 102 is provided with a network simulator 105, a simulation library 104, and can include end station simulators 109, a graphical user interface 108 and a scripting interface 107. The simulation system 102 can be executed on a single computer, such as a Solaris workstation, or it can be distributed among several computers.

The Graphical User Interface (GUI) 108 can be provided to give a user a graphical interface for controlling and viewing the states of the system. The GUI 108 provides for topology creation and allows a user to graphically compose the network topology using drag and drop mouse movements to specify hardware to be simulated and their interconnecting links with at least one emulator system 101. The GUI 108 can permit the user to specify which emulator system 101 instance is used for emulating a particular node in the topology of the network system being composed. The GUI 108 allows the user to create a network topology, start and stop the simulator, manipulate and inspect the memory map of any device in the network, monitor the packets on the links, and inject failures. Among other things, the GUI 108 can be programmed to perform the management functions on any simulated node and to program the end stations to perform specific tasks. The GUI 108 can provide a hardware generator and can be provided on one or more machines having separate functions. Greater detail for the operation of the GUI 108 is provided below.

The simulator library 106 is provided as an application programming interface to give a user a library of software function calls which can be requested through the GUI 108 or the scripting interface 107. Such processes can include creation of hardware components to be simulated, programming of functionality of the end stations 109, reading diagnostic information of the simulated network, and introduction of errors into the system for testing among other things. In addition, the processes can be also used to control the functionality implemented by the various components of the network simulator 105, among other things. Alternatively, the simulator library can be provided with an end station library for simulating a scripted end station 109.

The scripting interface 107 is provided to permit a user with a command line interface to request a particular function call of the simulator library. The scripting interface 107 can also process a script to request a sequence of operations to be carried out on the simulated network. The scripting interface 107 provides all of the function calls that the GUI 108 allows the user to perform. However, unlike the GUI 108, the scripting interface 107 can be used to write regression tests to be automated without user interaction. As a particular aspect of the embedded software 103 is modified, the scripting interface 107 can be used to automate a suite of tests of the embedded software 103 with the simulated network without requiring user interaction with the system during the tests.

At least one end station simulator 109 can be provided for simulating end stations which participate in the simulated network. End stations being simulated include such devices as subtending routers among other things. Each end station simulator 109 can be implemented either as a scripted or as a real interface. A scripted end station simulator 109 can be provided with limited functionality which only simulates those responses from the end stated simulator 109 which can be expected to be elicited by events from the emulator system 101. For example, a user can specify IP packet exchanges between an end station simulator 109 and its subtending interface card in the network simulation by using a scripting interface language such as Itcl. The scripted end station simulator 109 is provided to communicate with the network simulator 105 through a TCP/IP connection. to an end station stub 307.

A real interface end station simulator 109 is provided to connect to a real end station—e.g., a router—over Ethernet or another medium, and provide that end station with communication with the simulated network. The real interface end station simulator 109 can receive any packet arriving on the real interface and deliver it to the end station stub 307 which then injects the packet into the simulated network as described by the user-specified links of the network topology. Communication between the real interface end station simulator 109 and the network simulator 105 can be provided via a TCP/IP connection.

Figure 2:
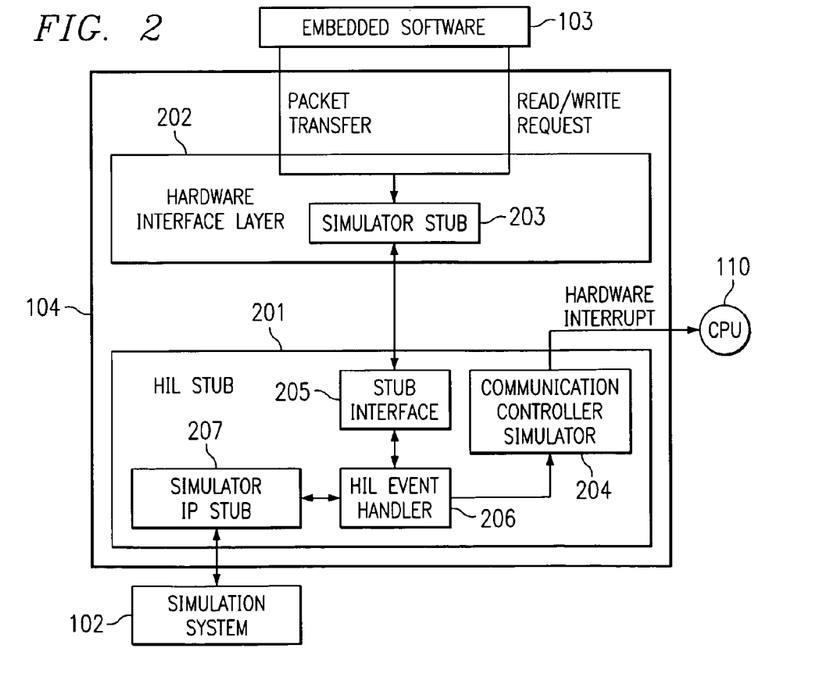
FIG. 2 is a block diagram of an architecture for an embodiment of a software emulator in accordance with the invention in FIG. 1.

One embodiment of the HIL interface 104 is shown in FIG. 2. The HIL interface 104 includes an HIL stub 201 and a hardware interface layer 202. The hardware interface layer 202 is provided to filter communications from the embedded software 103 with the hardware on-board the emulator system 101. The hardware interface layer 202 includes a simulator stub 203 for intercepting memory calls to any simulated memory-mapped device. Simulated memory mapped devices include registers on peripheral devices or memory on simulated devices among other things. Read, and write requests from the embedded software 103 go through the hardware interface layer 202 and are intercepted by the simulator stub 201. Write calls are immediately returned and read calls are blocked until a response has been received. Memory calls from the embedded software 103 that are directed to on-board memory 111 of the emulator system 101 can be permitted by the simulator stub 203 to pass through. Messages that are intercepted by the simulator stub 203 are converted into a protocol suitable for inter-process communication (IPC) and are sent to the HIL stub 201. The IPC message has a protocol, which at a low-level, is dependent upon the embedded operating system. At a higher layer, the messages can represent simulated events.

Depending upon the characteristics attributed to the simulated hardware, the HIL stub 201 can provide one or more communications controller 204 for communicating between the CPU 110 of the emulator system 101 and any peripherals associated with the emulator system 101. Communication controllers 204 can be provided to simulate behavior of simulated devices on the physical board and which are provided by the network simulator 105. For example, a simulated DMA controller can be provided for simulating transferal of data from a peripheral's memory to the physical board's main RAM. Since the peripheral's memory is simulated and the memory on the physical board is not, the communication controller 204 can give the simulator access to the physical board's RAM. To achieve this, a simulation of the DMA controller resides in the emulator system 101. Communication controllers 204 can also be used to process interrupt events from the simulated hardware of the emulator system 101. In such a case, the communication controller 204 receives interrupt events and calls an appropriate interrupt service routine from the network simulator 105. Each communications controller 204 can be specifically provided to maintain register values and to manage the DMA or interrupt handling operations as needed.

Communication between the embedded software 103 and the simulated peripherals are replaced by a socket connection to the network simulator system 105. The socket connection can be any two-way communication such as may be provided by TCP/IP. Alternatively, a serial connection can be provided which maintains a unique communications path between an emulator system 101 and the simulation system 102.

A stub interface 205 can be provided to manage inter-process communications or communications between the HIL 202 and the HIL Stub 201. Such communications can be made directly to the HIL event handler 206 of the HIL Stub 201. Where a stub interface 205 is used, the stub interface 205 is provided to maintain a main event queue which can be written to by the simulator stub 203 and read by the HIL event handler 206. Alternatively, the main event queue can also be written to by the simulator IP stub 203. The stub interface 205 also maintains a response queue which can be written to by communications controllers 204 and the HIL event handler 206. The response queue of the stub interface 205 can be read by the simulator stub 202.

The simulator IP stub 203 is provided to encapsulate communications between the embedded software 103 and the simulation system 102. Details of one method of encapsulating communications between the emulator system 101 and the simulation system 102 are described below. The simulator IP stub 203 encapsulates socket communications, transmits and receives socket messages, and delivers socket messages to the HIL event handler 206.

The HIL event handler 206 is provided to handle incoming data from the simulator IP stub 203 and the stub interface 205, if provided, or the simulator stub 203. The HIL event handler 206 passes responses from read requests back to the embedded software 103 via the stub interface 205.

Figure 3:
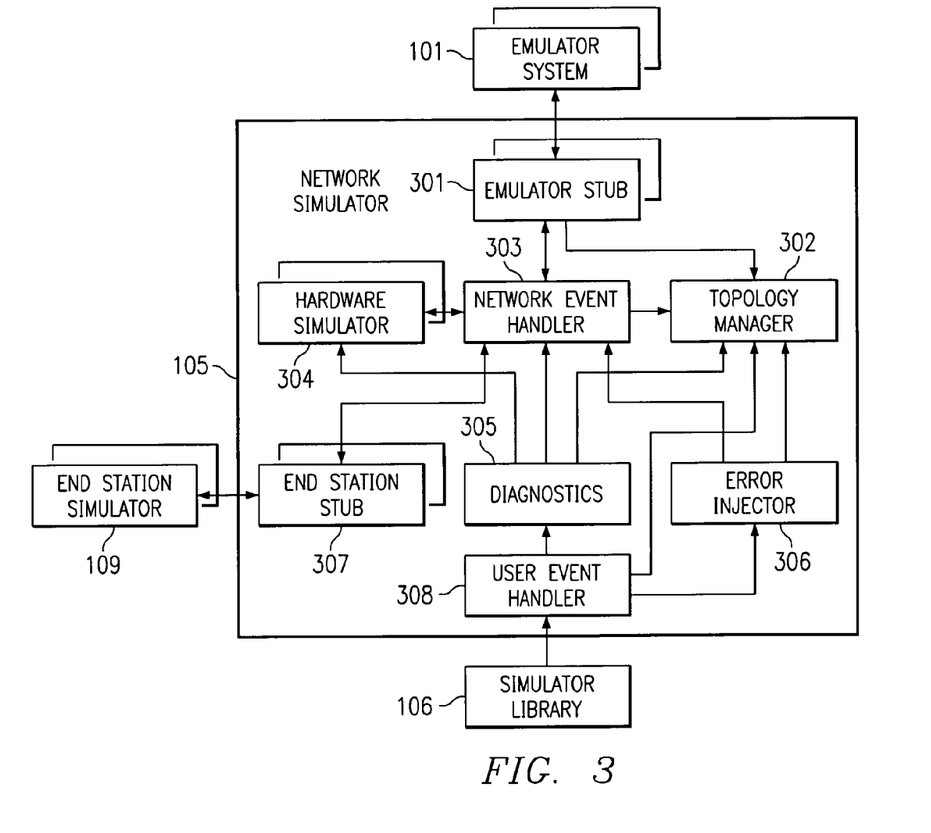
FIG. 3 is a block diagram of an architecture for an embodiment of a network simulator in accordance with the invention in FIG. 1.

FIG. 3 shows one embodiment of the network simulator 105. The network simulator 105 communicates with the software emulators 101 and simulates communication between the embedded software 103 and simulated memory at a register access and at the DMA level. The network simulator 105 also simulates communications between the simulated devices of the simulated network. For example, for read register requests from the embedded software 103, results are sent back to the appropriate device. Read and write actions on registers—such as a write request to a reset register that causes all other registers in a device to clear their values—can result in other registers being changed. The network simulator 105 generates interrupts in response to writes to the appropriate bits in all force-interrupt registers. The setting of corresponding interrupt mask registers can prevent the force-interrupt registers from generating interrupts. A read or write operation can cause interactions between nodes in a simulated network, such as a packet being sent, which can evoke register changes, interrupts and other things in other simulated nodes. Nodes represent logical entities which can be provided for by the emulator system 101, the associated emulator stub 301, and the hardware simulator 304. The network simulator 105 runs a simulation of events of all nodes in the network and can thereby provide for connection to several emulator systems 101. In addition, the network simulator can save the current state of a series of register and memory banks and reload that state at a later time.

By providing additional connections, which can be provided as TCP/IP, the network simulator 105 can communicate with end station simulators 109. The end stations simulators 109 can be simulated or be provided as an actual physical interface. In addition, the network simulator 105 can receive user information and instructions through a remote procedure call from either the scripting interface 107 or the graphical user interface (GUI) 108. The network simulator 105 maintains a topology of the network being simulated as well as state information for each simulated physical device. The network simulator 105 can inject errors into the network for testing purposes or perform diagnostic operations.

The network simulator 105 is provided with at least one emulator stub 301 which coordinates communications between the network simulator 105 and each instance of an emulator system 101. Several instances of each emulator system 101 can be handled at once by maintaining a one to one mapping of an emulator stub 301 to each emulator system 101. The emulator stub 301 encapsulates the socket communication, decodes and encodes events to and from the socket messages, transmits and receives messages, and delivers and receives events to and from the network event handler 303.

Hardware simulators 304 are provided to emulate the software and hardware activities executed on the simulated devices. Each hardware simulator 304 runs a state machine for the hardware of a single device. One to one correspondence of each hardware simulator 304 to an emulated device is provided to ensure consistency in the state of the system. Each hardware simulator 304 also maintains all of the tables and other data that would otherwise be maintained by the real hardware. Such tables can include a packet matching lookup table among other things. In addition, each hardware simulator 304 can be programmed to process information and events as would the real hardware, for example by processing packets. Each instance of hardware simulator 304 is not provided with knowledge of the entire network but is configured as a stand alone component connected to the network according to the network topology. Each hardware simulator 304 receives and sends events to or from the network event handler 303. The events are either events from the embedded software 103, events from an end station simulator 109, or events from another hardware simulator 304. All of these events are received, processed, and delivered by the network event handler 303.

The network event handler 303 is provided to perform as the central event processing unit for the network simulator 105. The network event handler 303 receives events from each software emulator 101, each hardware simulator 304, and each end station simulator 109. Events can include any message, control or data that is passed among the hardware simulators 304, the embedded software 103 or an end station simulator 109. The network event handler 303 determines the destination of an event and delivers the event to the appropriate hardware simulator 304, end station simulator 109, or instance of embedded software 103. The network event handler 303 consults with a topology database maintained by a topology manager 302 in order to determine the proper destination of an event. The network event handler 303 can also be provided to log all of the events to a file. Time information related to these events can also be recorded.

A user event handler 308 can be provided to process commands from the simulator library 106 and to distribute commands to the appropriate simulator component. The user event handler 308 processes commands for populating the topology database as described below. The user event handler 308 also provides for the invocation of the simulated end stations 109, both scripted and real, the injection of errors into the system for testing, as well as the display of diagnostics data from the system. The user event handler

308 provides an active processing thread and passes any asynchronous notifications back from the network simulator 105 to the GUI 108. Alternatively, multiple threads of control can be provided.

A topology manager 302 is provided to allow a user to create a network topology by providing a set of commands to specify the devices, links, and end stations of the simulated network and is used by the network event handler 303 to map sources to destinations. Sources and destinations are network devices, real or emulated, that can be linked by communications ports though the network simulator 105. The topology manager 302 permits an invocation of the topology and maintains the topology database that can be consulted by the network event handler 303 for the distribution of events. In one embodiment of the simulator 100 according to the invention, there is just a single instance of the topology manager 302, however additional topology managers can be provided. The topology database contains a node table and several link tables. The node table contains information about the logical nodes in the topology where each node is accessed by its LocationID value. Each node table entry contains a link table for providing a mapping from a source (LocationID, Port) to a destination (LocationID, port) for that node in the topology. In addition the topology database maintains properties of the link, such as error conditions. The node table provides a mapping from a LocationID to an EventAcceptor for the LocationID. An EventAcceptor is any device in the network which can accept the event. EventAcceptors include the hardware simulators 304, end station stubs 307 and emulator stubs 301 among other things. The node table also maintains properties of the node, such as error condition, IP address/port number, among others things. The topology manager 302 can optimize the storage of the topology for fast access during simulator operation.

The end station stub 307 is provided for forwarding messages between an end station simulator 109 and the network event handler 303. One instance of an end station stub 307 is provided for every instance of an end station simulator 109 provided in the network. The end station stub 307 can communicate with an end station simulator 109 through a communication link which can be provided as TCP/IP.

An error injector 306 is provided for simulating various error conditions in the simulated network such as dropped packets, erroneous packets, nodes failing, links failing, and card removal. The error injector 306 communicates error requests from the GUI 107 or scripting interface 108 through the user event handler 308 to the network event handler 303 and the topology manager 302.

A diagnostics module 305 is provided to allow the user to view internal data structures in the simulator system 100. The diagnostics module 305 retrieves data maintained by other portions of the system, such as the hardware simulators 304, and passes data to the GUI 108. The retrieved data can include the contents of hardware tables and registers from the hardware simulator 304 instances, data in the event log maintained by the network event handler 303, or packets exchanged by an end station simulator 109 with an emulator system 101, among other things.

Another alternative embodiment provides for a hardware generator which permits a user to utilize a GUI 108 to automate the creation of hardware simulators for use in the simulated network. A simulated network or a portion of a network, such as a network element, that has been generated can be saved, adapted and reused for other projects. The hardware generator permits definition of registers with either predefined functionalities or generates frameworks for project specific functionalities. Reusable units may be created by mapping registers into the address space of devices layered within other devices, such as address space of registers in chips, chips within boards, and boards within backplanes, among other things. Specific functionality can be created according to each layer of abstraction of reusable unit.

The hardware generator can provide for definition of two broad categories of objects: project objects and hierarchy node objects. Project objects describe the structure of a particular project's nodes, for example, how many shelves, cards, and ports exist in the node. This structure can be used by the simulator GUI 108 in response to a user request to create a new node and for determining how to display the node graphically. Hierarchy node objects describe the memory map of simulated devices. The hierarchy node objects are used by the hardware generator routines for creating simulator code for a simulated device.

The user can create a network of nodes by providing link interconnections between the simulated nodes and target processes of simulated hardware. Based on a users selection of unit and connections, the hardware generator compiles a graphical representation and produces a set of c++ classes for the simulator and a set of Itkl classes for the simulator GUI. These classes provide frameworks to which special functionality can be added by the user. The simulator can model the structure of network nodes as a set of shelves containing a set of cards. There can be zero to several CPU devices per card. Cards without devices can have their memory-mapped register controlled by another card's CPU device. Once a network definition is complete, a simulation of the network can be invoked.

Figure 4:
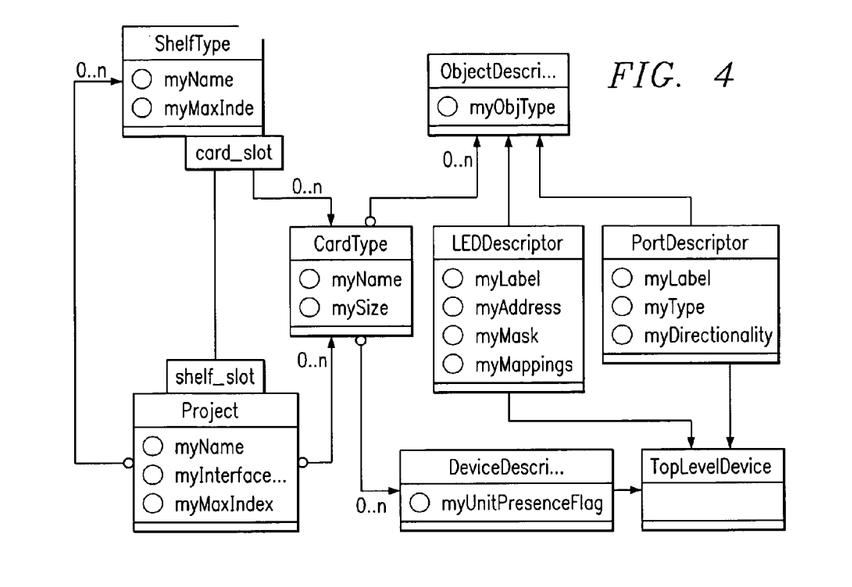
FIG. 4 is a block diagram of linked objects for one embodiment of the hardware simulator in accordance with the invention in FIG. 1.

In one embodiment, the relationship between project objects of the hardware generator can be provided as shown in FIG. 4. A Project class can be provided to contain information about the simulator for a project. At least one ShelfType class can be provided to contain a description of one type of shelf. At least one CardType class can be provided to contain a description of one type of card. At least on DeviceDescriptor class can be provided to contain a description of one of a card's top-level devices. At least one ObjectDescriptor class can be provided to contain a description of one of a card's objects (LED or port). At least one LEDDescriptor class can be provided to contain a description of how a card's LED object will function. At least one PortDescriptor class can be provided to contain a description of how a card's port object will function. At least one TopLevelDevice node can be provided as a node in the hierarchy tree where a hardware simulator roots its memory map. The TopLevelDevice can be given its own HardwareSimulator wrapper class to make it into an EventAcceptor.

Figure 5:
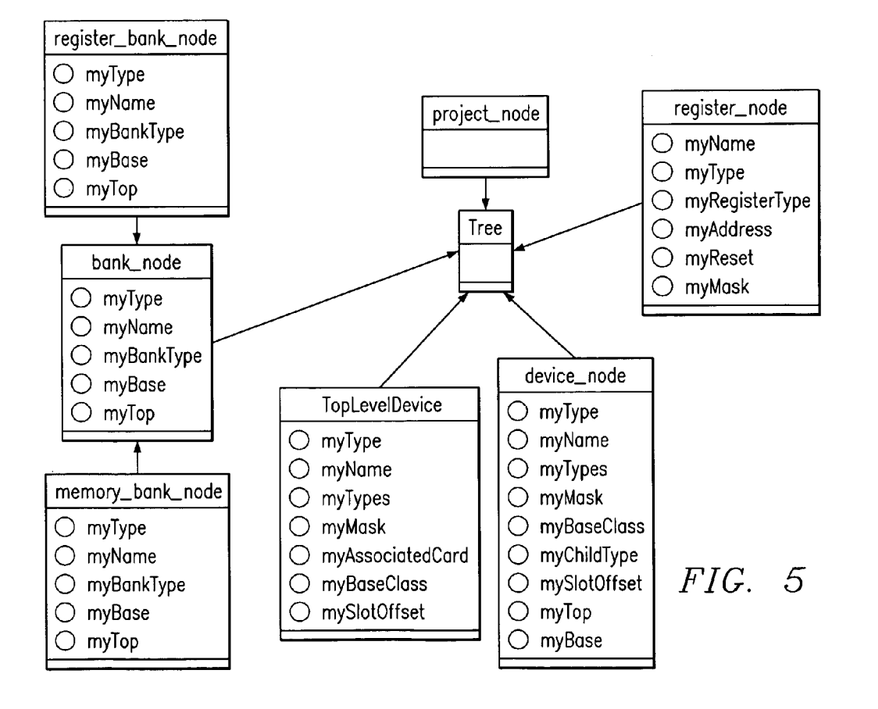
FIG. 5 is a block diagram of a hierarchy of nodes for one embodiment of a hardware simulator in accordance with the invention in FIG. 1.
Figure 6:
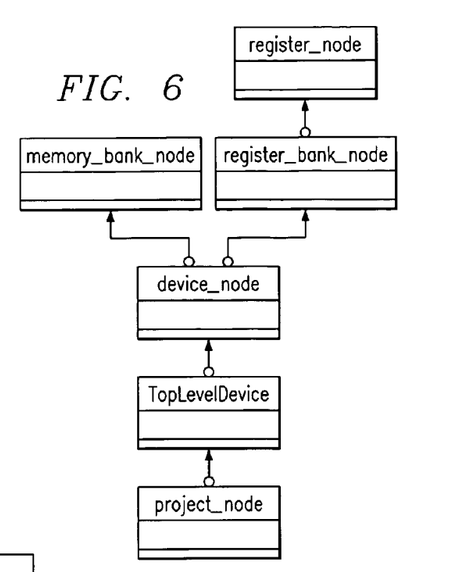
FIG. 6 is a block diagram showing a relationship of node types for one embodiment of a hardware simulator in accordance with the invention in FIG. 1.

Each project can contain a hierarchy of Tree nodes. Several types of Tree nodes are provided as shown in FIG. 5. A Tree node can be provided as a basic node type. A project_node can be provided as the root of the project's hierarchy. The project node can be provided with the list of TopLevelDevices as its children. A TopLevelDevice node can be provided as the root of a hardware simulator device. The TopLevelDevice can have a list of sub-devices as its children. A device_node can be provided which is a generic device node, and can be nested to create a configuration of ASICs within cards, etc. A bank_node can be provided which is the base class for banks of memory. The bank_node can either be of type memory, register, or a user-defined type. A memory bank_node can be provided which describes a bank of memory using base and top address values. A register_bank_node can be provided which describes a bank of registers. The number and location of the registers are specified via the base and top values. Each register contains 16-bits of data and registers are located on even word addresses (i.e., 0x0, 0x2, 0x4, 0x6 . . . ). A register_node is provided which describes an individual registers using name, register type, reset value, offset, and mask. The relationship between node types according to one embodiment is shown in FIG. 6.

The following files can be generated by the routines of the hardware generator. A devices.make file can be provided which contains the list of the files that need to be compiled for the project. This file can be automatically included in the main makefile for building the projects simulator. A sim_hardware_launcher.cc file can be provided to contain the launcher function for inclusion into the topology manager's CreateDevice procedure and the PacketSniffer function for inclusion into the EventLogger's packet dumping procedure. A sim_{top_level_device}_hardware_simulator.hh file can be provided which defines the hardware simulator for a top-level device. This file can be created once and can be modified by the simulator developer. A sim_{top_level_device})_hardware_simulator.cc file can be provided as the body of the top-level device class. This file is created once and can be modified by the simulator developer. A sim_{device}_simulator.hh file can be provided which defines a device's C++ class. This file is only created once and can be modified by the simulator developer. A sim_{device}_defines.hh file is provided to contain the definition of constants for the device. A sim_{device}_simulator.cc file is provided to contain the implementation of the device's C++ class. This file can be only created once and can be modified by the simulator developer. A sim_{device}_simulator_init.cc file is provided to contain the constructor for the device's C++ class. A {project}.itcl file can be provided to contain the information necessary by the simulator's iTCL interface (hw_gui and net_gui) for manipulating the generated simulator. It contains derived iTCL Device classes for each top-level device and a description of the project objects for described how create and display nodes.

The functions of the hardware generator can include a number of the following processes in creating a simulator. The hardware generator can be provided to create the project's iTCL file, create the top of the device.make file, and create the top of the Hardware Launcher file. Then for each top-level device, the hardware generator can provide each case statement to the launcher function, create the top-level device's hardware simulator header and implementation file, and create the top-level device's header, implementation, define, and initialization files.

For each of the top-level device's sub-devices, the hardware generator can create the top-level device's device's header, implementation, define, and initialization files; and add entries to the devices.make file. For each of the sub-device's, the hardware generator can be provided to add entries to the parent device's defines file for the sub-device. If the type is a "device", the hardware generator can add an entry to the parent's device's constructor to create the sub-device, and recursively process the sub-device. Otherwise, in one alternative, if the type is a "memory bank", the hardware generator can add an entry to the parent's device's constructor to create the memory bank. In a second alternative, if the type is a "register bank," the hardware generator can add an entry to the parent's device's constructor to create the register bank, and for each of the register bank's registers, the hardware generator can add an entry to the parent device's constructor. Finally, the hardware generator can create a Packet Sniffer that can be used by the simulator for dumping the contents of the packets.

Figure 7:
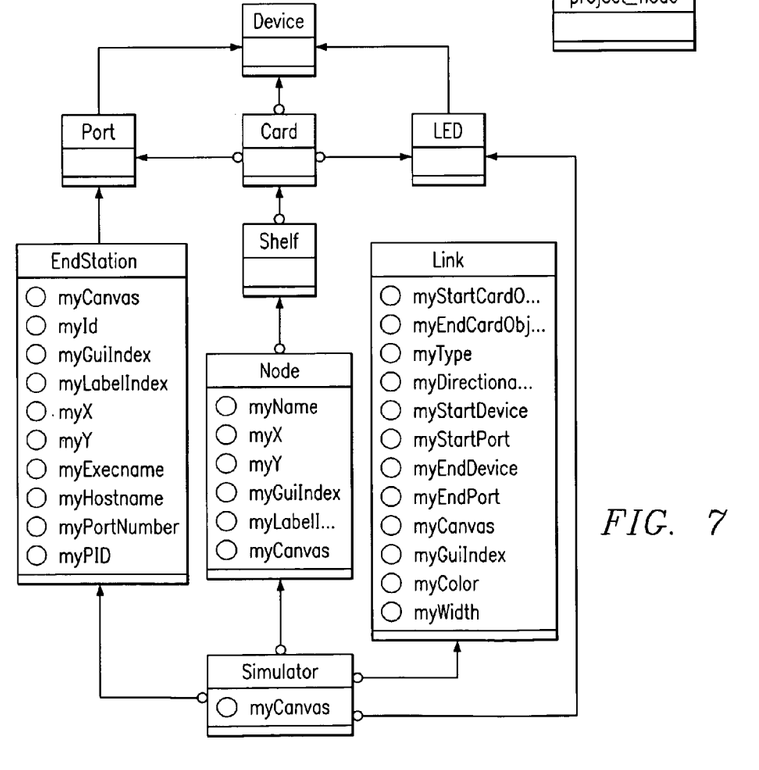
FIG. 7 is a block diagram of linked class objects for one embodiment of a hardware simulator in accordance with the invention in FIG. 1.

The GUI 108 can provide a function interface for added project-specific extensions to a basic platform GUI 108. The GUI 108 uses the hardware generator's project objects to determine how to create and display new nodes and endstation simulators 109. Thus, the hardware generator's project objects act as the recipe to the GUI 108 for how to construct new nodes. The actual instances of the nodes and endstation simulators 109 can be described by another set of iTcl class objects as shown in FIG. 7.

A Simulator class can be provided for encapsulation of the simulator-wide functionality, such as invoking, turning logging on and off, etc. A node class can be provided which describes one node in the topology. Each node includes a list of ShelfObjects. An Endstation can be provided which describes an endstation simulator 109 in the topology. Each Endstation can be provided with a name, a hostname, a TCP port number, and executable name, and a PortObject. A Link class can be provided which describes a connection between two ports in the topology. A Shelf class can be provided which contains the description of one of a node's shelves. The description can specify which types of cards occupy each of the shelf's card slots. A Card class can be provided which contains a description of one card. The description can contain a pointer to the card's shelf and a list of the card's ports, LEDs and devices. A Port class can be provided which describes one port of a card or an endstation simulator's ports. This description can include the port's name, type, directionality, and visibility. An LED class can be provided which describes one of a card's LED objects. A LED object simulates a Light Emitting Diode by mapping a value stored in a specific address to a set of colors to display. A Device class is provided to encapsulate the functionality of a top-level device. It contains the topology manager's ID so that the GUI 108 can identify the device after creation. Each project can derive its own Device classes from the Device base class. These derived classes can be defined in the {project}.itcl file.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A hardware simulation system for simulating hardware on which software is to be tested comprising:
   a hardware interface for intercepting and redirecting communications between the software being tested and the simulated hardware and returning responses to the software;
   a network simulation system in communication with said hardware interface for providing simulated hardware and generating responses to the software; and
   a user interface for entering user commands for creating a simulated network, defining topology of said simulated network, and for invoking said simulated network, said user interface being in communication with said network simulation system; wherein
   said network simulation system includes:
      a network simulator for simulating functionality of said simulated network, said network simulator being in communication with said hardware interface;
      a simulator library for providing an application programmers interface for creating said simulated network and for defining functionality of said simulated network; said simulator library being in communication with said network simulator and said user interface;

an emulator stub for translating communications between said network simulator and said hardware interface; said emulator stub being in communication with said hardware interface; and an event handler for directing communications received by said emulator stub and returning communications to said emulator stub.

2. The hardware simulation system according to claim 1 wherein the network simulator comprises:

a topology manager for maintaining a topology of the simulated network, said topology manager being in communication with said emulator stub;

at least one hardware simulator for simulating hardware, said at least one hardware simulator being in communication with said event handler; and a user event handler for handling said user commands and returning responses from said network event handler to said user interface, said user event handler being in communication with said user interface, said event handler, said at least one hardware simulator, and said topology manager.

3. The hardware simulation system according to claim 1 wherein the network simulation system further comprises an end station simulator for simulating an end station, said end station simulator being in communication with said network simulator.

4. The hardware simulation system according to claim 1 wherein said hardware interface further comprises:

a simulator stub for translating communications between said hardware interface and said simulated hardware and said software; said simulator stub being in communication with said simulated hardware and software;

a hardware interface event handler for redirecting communications between the simulated hardware, software and network simulator; and an IP stub for translating communications from said hardware interface and said simulator system.

5. The hardware simulation system according to claim 1 wherein the simulated hardware includes peripheral portions and said hardware interface further comprises a communications controller for communicating with said peripheral portions.

6. A hardware simulation system for simulating hardware on which software is to be tested comprising:

hardware interface means for intercepting and redirecting communications between the software being tested and the simulated hardware and returning responses to the simulated hardware and the software;

network simulation means in communication with said hardware interface means for providing simulated hardware and generating responses to the software and hardware; and user interface means for entering user commands for creating a simulated network, defining functionality of said simulated network, and for invoking said simulated network, said user interface means being in communication with said network simulation means; wherein said network simulation means includes:

network simulator means for simulating functionality of said simulated network, said network simulator means being in communication with said hardware interface means;

simulator library means for providing an application programmers interface for creating said simulated network and for defining functionality of said simulated network; said simulator library means being in communication with said network simulator means and said user interface means;

emulator stub means for translating communications between said network simulator means and said hardware interface means, said emulator stub means being in communication with said hardware interface means; and event handler means for directing communications received by said emulator stub means and returning communications to said emulator stub means.

7. The hardware simulation system according to claim 6 wherein the network simulator comprises:

topology manager means for maintaining a topology of the simulated network, said topology manager means being in communication with said emulator stub means;

at least one hardware simulator means for simulating hardware, said at least one hardware simulator means being in communication with said event handler means; and user event handler means for handling said user commands and returning responses from said network event handler means to said user interface means, said user event handler means being in communication with said user interface means, said event handler means, said at least one hardware simulator means, and said topology manager means.

8. The hardware simulation system according to claim 6 wherein the network simulation means further comprises an end station simulator means for simulating an end station, said end station simulator means being in communication with said network simulator means.

9. The hardware simulation system according to claim 6 wherein said hardware interface means further comprises:

simulator stub means for translating communications between said hardware interface means and said simulated hardware and said software; said simulator stub means being in communication with said simulated hardware and software;

hardware interface event handler means for redirecting communications between the simulated hardware, software and network simulator means; and an IP stub means for translating communications from said hardware interface means and said simulator system means.

10. The hardware simulation system according to claim 6 wherein the hardware includes peripheral portions and said hardware interface means further comprises a communications controller means for communicating with said peripheral portions.

* * * * *